US007085251B2

(12) United States Patent
Rezaiifar

(10) Patent No.: US 7,085,251 B2
(45) Date of Patent: Aug. 1, 2006

(54) METHOD AND APPARATUS FOR HANDOFF OF A WIRELESS PACKET DATA SERVICES CONNECTION

(75) Inventor: Ramin Rezaiifar, San Diego, CA (US)

(73) Assignee: Qualcom Incorporated, San Diego, CA (US)

( * ) Notice: Subject to any disclaimer, the term of this patent is extended or adjusted under 35 U.S.C. 154(b) by 384 days.

(21) Appl. No.: 10/288,662

(22) Filed: Nov. 4, 2002

(65) Prior Publication Data

US 2004/0085931 A1 May 6, 2004

(51) Int. Cl.
*H04B 7/00* (2006.01)

(52) U.S. Cl. .................................... 370/331; 370/310.1
(58) Field of Classification Search ................. 370/331, 370/310.1; 455/426.1, 426.2, 414.2, 456.1, 455/456.2; 709/227, 242
See application file for complete search history.

(56) References Cited

U.S. PATENT DOCUMENTS

| 6,580,699 | B1 | * | 6/2003 | Manning et al. ............ 370/331 |
| 6,738,373 | B1 | * | 5/2004 | Turner ......................... 370/352 |
| 2002/0021681 | A1 | * | 2/2002 | Madour ....................... 370/331 |
| 2002/0048266 | A1 | * | 4/2002 | Choi et al. .................. 370/331 |
| 2002/0067707 | A1 | * | 6/2002 | Morales et al. ............. 370/331 |
| 2002/0068570 | A1 | * | 6/2002 | Abrol et al. ................ 455/438 |
| 2002/0141361 | A1 | | 10/2002 | Madour et al. |
| 2002/0145990 | A1 | | 10/2002 | Sayeedi |
| 2002/0196749 | A1 | * | 12/2002 | Eyuboglu et al. .......... 370/328 |

FOREIGN PATENT DOCUMENTS

| CA | 2359040 A1 | 3/2002 |
| WO | 01/67786 A2 | 9/2001 |
| WO | 02/47407 A2 | 6/2002 |
| WO | 02/47427 A2 | 6/2002 |
| WO | 03/061219 A2 | 7/2003 |

OTHER PUBLICATIONS

Wireless IP Network Standard, Oct. 25, 2002, 3GPP2, P.S0001-B, Version 1.0.*
Wireless IP Network Standard, Jul. 16, 2001, 3GPP2, P.S0001-A, Version 3.0.*
Interoperability Specification (IOS) for CDMA 2000 Access Network Interfaces, Nov. 16, 2001, 3GPP2, A.S0017-0, Versio 1.0.*
CDMA2000 High Rate Packet Data Air Interface Specification, Dec. 5, 2001, 3GPP2, C.S0024, Version 3.0, pp. 1–1 through 1–20 and 3–1 through 3–29.*
1xEV–DO Inter–Operability Specification (IOS) for CDMA 2000 Access Network Interfaces, Jun. 14, 2001, A.S0007, Ballot Version.*
3GPPS: "Inoperability Specification (IOS) for High Rage Packet Data (HRPD) Access Network Interfaces, Rev. A," $3^{rd}$ Generation Partnership Project 2, Sep. 30, 2002, p. 1.1–2.9, 3.28–4.16, 5.44–5.45.

* cited by examiner

*Primary Examiner*—Wellington Chino
*Assistant Examiner*—Mark A Mais
(74) *Attorney, Agent, or Firm*—Philip Wadsworth; Sandra L. Godsey

(57) ABSTRACT

Methods and apparatus for providing location information to an Access Terminal (AT) when the Access Network (AN) is unable to contact a last serving PDSN, else maintaining the previous location information. In one embodiment, AN elements within an area supported by a Packet Data Serving Node (PDSN) are given a same Access Network ID (ANID). In this way, movement of the AT within the area supported by the PDSN do not initiate an update of location information. The AT receives location information specific to the PDSN and not the AN.

14 Claims, 12 Drawing Sheets

US 7,085,251 B2

METHOD AND APPARATUS FOR HANDOFF OF A WIRELESS PACKET DATA SERVICES CONNECTION

BACKGROUND

1. Field

The present invention relates to wireless communications. More particularly, the present invention relates to a novel method and apparatus for performing seamless handoff of a mobile station between radio access networks having different wireless interfaces during wireless packet data service operation.

2. Background

To satisfy the increasing demands for data communications in wireless communication systems, radio networks are designed to interface with packetized data networks supporting Internet Protocol (IP) networks. Packet Data Serving Nodes (PDSNs) provide interface between the radio network and the IP network or other data network. Various protocols, such as "mobile IP," specify the interactions between the radio network and the PDSN.

When a Mobile Station (MS) moves from the serving area of one PDSN to that of another PDSN, the configuration information is updated so that a Home Agent (HA) associated with the MS may redirect communications. There is a need for an efficient method for accommodating movement within a communication system.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION

Figure 1A:
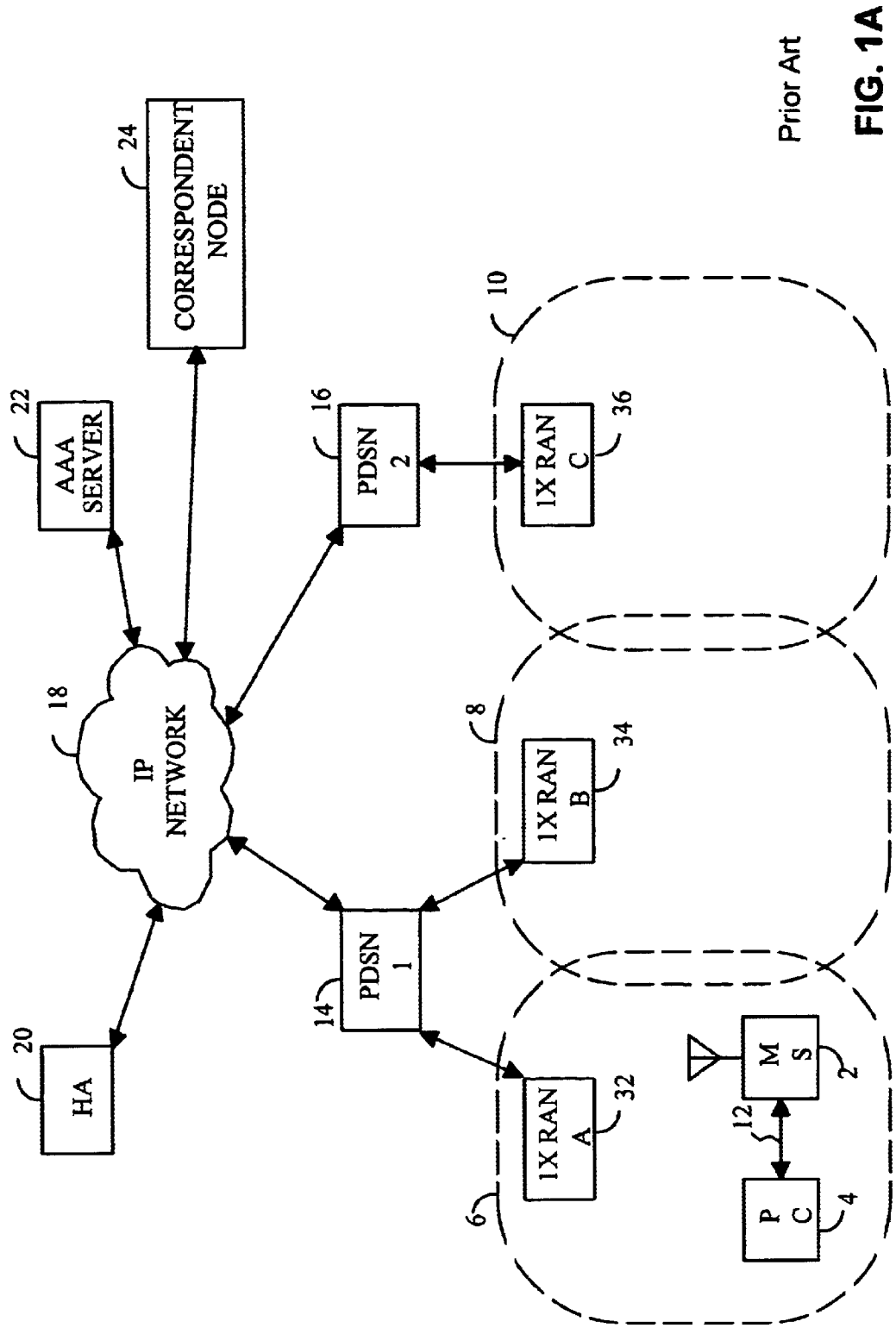
FIG. 1A is a diagram of a wireless system configuration using only 1× Radio Access Networks (RANs)

The word "exemplary" is used in this application to mean "serving as an example, instance, or illustration." Any embodiment described as an "exemplary embodiment" is not to be construed as necessarily preferred or advantageous over other embodiments described herein.

The use of Code Division Multiple Access (CDMA) modulation techniques are one of several techniques for facilitating communications in which a large number of system users are present. Other multiple access communication system techniques, such as Time Division Multiple Access (TDMA), Frequency Division Multiple Access (FDMA) and AM modulation schemes such as Amplitude Companded Single Sideband (ACSSB) are known in the art. These techniques have been standardized to facilitate interoperation between equipment manufactured by different companies. CDMA communication systems have been standardized in the United States in Telecommunications Industry Association TIA/EIA/IS-95-B, entitled "MOBILE STATION-BASE STATION COMPATIBILITY STANDARD FOR DUAL-MODE WIDEBAND SPREAD SPECTRUM CELLULAR SYSTEMS", and referred to herein as IS-95. In addition, a new standard for CDMA communication systems has been proposed in the United States in Telecommunications Industry Association (TIA), entitled "Upper Layer (Layer 3) Signaling Standard for cdma2000 Spread Spectrum Systems, Release A—Addendum 1", dated Nov. 2000, and referred to herein as "1×." An additional standard for providing high speed data services in the TIA is, entitled "cdma2000 High Rate Packet Data Air Interface Specification," and referred to herein as "HDR" or "IS-856."

The International Telecommunications Union recently requested the submission of proposed methods for providing high rate data and high-quality speech services over wireless communication channels. A first of these proposals was issued by the Telecommunications Industry Association, entitled "The IS-2000 ITU-R RTT Candidate Submission." A second of these proposals was issued by the European Telecommunications Standards Institute (ETSI), entitled "The ETSI UMTS Terrestrial Radio Access (UTRA) ITU-R RTT Candidate Submission", also known as "wideband CDMA" and hereinafter referred to as "W-CDMA." A third proposal was submitted by U.S. TG 8/1 entitled "The UWC-136 Candidate Submission", hereinafter referred to as "EDGE." The contents of these submissions are public record and are well known in the art.

IS-95 was originally optimized for transmission of variable-rate voice frames. Subsequent standards have built on the standard to support a variety of additional non-voice services including packet data services. One such set of packet data services was standardized in the United States in Telecommunications Industry Association TIA/EIA/IS-707-A, entitled "Data Service Options for Spread Spectrum Systems", incorporated by reference herein, and hereafter referred to as "IS-707."

IS-707 describes techniques used to provide support for sending Internet protocol packets through an IS-95 wireless network. Packets are encapsulated into a featureless byte stream using a protocol called Point-to-Point Protocol (PPP). Using PPP, IP datagrams having lengths of up to 1500 bytes can be transported over a wireless network in segments of arbitrary size. The wireless network maintains PPP state information for the duration of the PPP session, or as long additional bytes may be sent in the continuous byte stream between the PPP end points.

A remote network node such as a personal or laptop computer (PC) connected to a packet-data-capable wireless mobile station may access the Internet through a wireless network in accordance with the IS-707 standard. As used throughout the following description, the terms MS, Access Node (AN), Mobile Node (MN) and remote station, each refer to a mobile participant in a wireless communication. Alternatively, the remote network node such as a web browser may be built-in to the MS, making the PC optional. An MS may be any of a number of types of devices including, but not limited to PC card, Personal Data Assistant (PDA), external or internal modem, or wireless phone or terminal. The MS sends data through the wireless network, where it is processed by a packet data serving node. The PPP state for a connection between an MS and the wireless network is typically maintained within the PDSN. The PDSN is connected to an IP network such as the Internet, and transports data between the wireless network and other entities and agents connected to the IP network. In this way, the MS can send and receive data to another entity on the IP network through the wireless data connection. The target entity on the IP network is also called a correspondent node.

The MS must obtain an IP address before sending and receiving IP packets over the IP network. In some early implementations, the MS was assigned an IP address from a pool of addresses belonging exclusively to the PDSN. Each PDSN was connected to one or more Radio Access Networks (RANs) associated with a limited geographical area. When the MS moved out of the area served by the first PDSN, data addressed to the MS through the first PDSN could not reach the MS. If the MS moved into an area served by a second PDSN, the MS would have to be assigned a new IP address from the address space of the second PDSN. Any ongoing connection with a correspondent node that was based on the old IP address would be abruptly terminated.

In order to prevent connections from being lost when moving from PDSN to PDSN, MSs use a protocol known as mobile IP. The Internet Engineering Task Force (IETF) has standardized mobile IP in request for comments (RFC) 2002, entitled "IP Mobility Support," published in October 1996, and well known in the art. The use of mobile IP in cdma2000 networks has been standardized in EIA/TIA/IS-835, entitled "Wireless IP Network Standard," dated June 2000, and referred to herein as "IS-835." In mobile IP, the PDSN does not provide an IP address from its own pool of addresses. Instead, the PDSN acts as a foreign agent that facilitates assignment of an address from a home agent located somewhere in the IP network. The MS communicates through the FA to the HA, and receives an IP address assigned from an address pool belonging to the HA. When the MS moves from a first PDSN to a second PDSN, the MS communicates through the second PDSN and FA in order to re-register its existing IP address with the HA.

IS-707 and IS-835 describe a dormant mode, in which a wireless link that was established for transporting packet data, but which is idle for a certain period of time, may be reclaimed by the network without terminating the associated PPP session. When the flow of packet data resumes, the wireless link is re-established without having to repeat PPP configuration and negotiation. Preserving the PPP state when the wireless link has been terminated thus enables the MS and the wireless network to resume sending packet data more quickly than if the PPP state had to be re-established.

The proposed 1× standard provides mechanisms to update routing between an HA and multiple PDSNs and 1× RANs. The proposed HDR standards provide mechanisms to update routing between an HA and multiple PDSNs and HDR RANs. Both the HDR and 1× standards can effectively update packet routing even when an MS changes RANs while in dormant mode, as long as the MS does not move to a RAN using a different type of wireless interface. For example, if an MS moves from a 1× RAN to an HDR RAN while dormant, routing ambiguities or redundancies can occur, and packets can be lost. As these various systems are deployed, there will be a need for mechanisms to effectively update routing of packets to an MS moving between RANs using different types of wireless interfaces.

FIG. 1A depicts a network configuration in a system using only 1× radio access networks 32, 34, 36. In an embodiment, a personal or laptop computer 4 is connected to a wireless MS 2 through a data connection 12. The data connection 12 between the PC and the MS 2 may use a physical cable such as an Ethernet, serial, or Universal Serial Bus (USB) cable. Alternatively, the data connection 12 may be a wireless connection such as an infrared or other optical connection or a radio connection such as Bluetooth or IEEE 802.11 Wireless Local Area Network. As previously discussed, the PC may alternatively be incorporated into the MS 2 to enable network access through a single device. In the figure, the MS 2 changes its physical location among coverage areas 6, 8, 10 associated with RAN 32, RAN 34, and RAN 36, also illustrated as RAN A, RAN B, and RAN C in FIG. 1, respectively. RAN 32 and RAN 34 are connected to PDSN 14, which in turn is connected to an IP Network 18. RAN 36 is connected to PDSN 16, which is then connected to the IP Network 18. Also accessible through the IP Network 18 are a home agent 20, an Authentication, Authorization and Accounting (AAA) Server 22, and a correspondent node 24. Multiple additional PDSNs, HAs, AAA Servers, and correspondent nodes may be connected to the IP Network 18 but are omitted for simplicity. Note, in the present embodiment RAN A, RAN B, and RAN C each support the 1×EV-DO Rev. Ø specification, as identified in FIG. 1 as "1× RAN," but do not support IS-856 HDR specification.

When the MS 2 initially connects to a RAN, for example RAN 32, the MS 2 must obtain an IP address from some entity that is connected with the IP network 18. As discussed above, in early implementations the MS 2 was assigned an IP address from a pool of addresses allocated to the PDSN 14. Because all packets bearing an IP address from that pool of addresses would be routed to the PDSN 14 by the IP network 18, the PDSN 14 could then route those packets to the corresponding MS 2. However, if the MS 2 moved out of the coverage of any RAN connected to the PDSN 14, the PDSN 14 would no longer be able to forward packets to the MS 2. For example, if the MS 2 moved from the coverage area 6 of RAN 32 to the coverage area 10 of RAN 36, the MS 2 would have to obtain a new IP address from the address pool of PDSN 16. Any packets sent to the old address associated with PDSN 14 would have to be discarded, and any ongoing network connections using the old address could no longer be used.

In more recent mobile IP implementations, the MS 2 instead obtains its IP address from an HA 20 connected to the IP Network 18. After obtaining an address from the pool associated with HA 20, mobile IP protocol enables the MS 2 to receive packets bearing that IP address through any of multiple RANs, 32, 34, or 36, or through any of multiple PDSNs 14 or 16. As an alternative to dynamic allocation of an IP address from the HA 20, the MS 2 may also have an IP address within the address pool of HA 20 provisioned in the memory of the MS 2 ahead of time, for example upon activation of services.

Figure 1B:
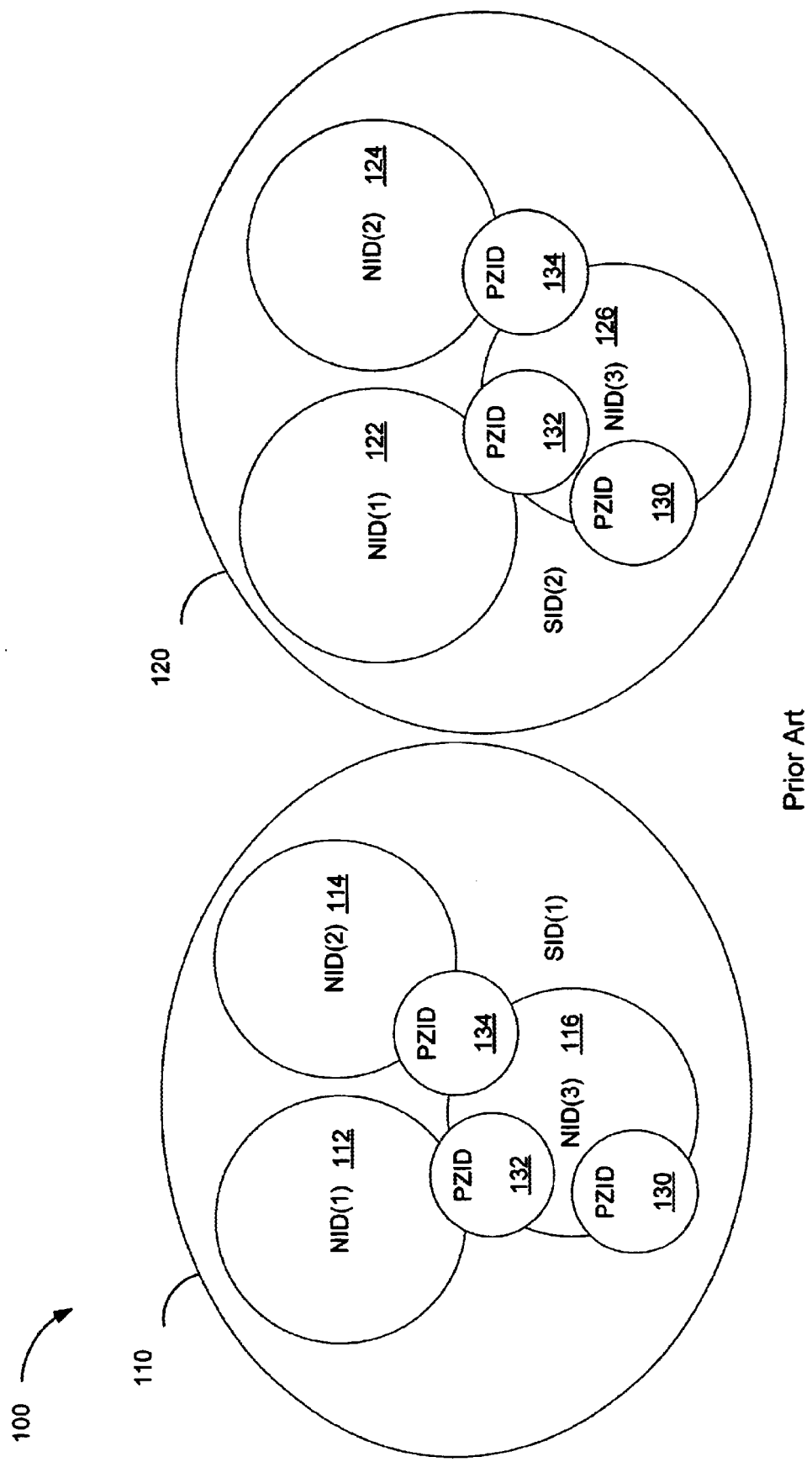
FIG. 1B is a diagram of a wireless system configuration illustrating packet zone identification.

FIG. 1B illustrates a packet data network 100 according to one embodiment. Note that alternate embodiments may have different terminology for similar functional units, and may incorporate different configurations of components and functional units. For the present discussion, the network 100 of FIG. 1B, and other detailed figures, will be used for defining a path; however, alternate embodiments may define a path according to the specific configuration and functions used therein. The packet data system 100 includes two System Identification (SID) zones 110, 120, each having multiple Network Identification (NID) zones 112, 114, 116, 122, 124, 126. The SID/NID are used in voice systems and generally identify a serving area. For example, an MSC serving area may be associated with a pair of (SID, NID) values.

For packet data communications within a system supporting packet data communications, such as system 100 of FIG. 1B, mobile IP communication and connectivity are described in "IP Mobility Support" by C. Perkins, dated October 1996, and referred to as RFC 2002. FIG. 1C illustrates the flow of information in datagrams for a given Mobile Node (MN) 260 or Mobile Station (MS) according to mobile IP. As illustrated, each mobile node 260 is a host or router that changes its point of attachment from one network or subnetwork to another. A mobile node may change location without changing IP address; and may continue to communicate with other Internet nodes at any location using that IP address, when link-layer connectivity to the point of attachment is available. Each mobile node 260 has an associated home agent 252. The home agent 252 is a router on the mobile node's home network which tunnels datagrams for delivery to the mobile node 260 when the mobile node 260 is away from home, and maintains current location information for the mobile node 260. The host 258 provides data which may be directed to mobile node 260. The host 260 also receives information from FA 254.

A foreign agent 254 is a router on a mobile node's visited network which provides routing services to the mobile node 260 while registered. The foreign agent 254 detunnels and delivers datagrams to the mobile node 260 that were tunneled by the mobile node's home agent 252. For datagrams sent by a mobile node 260, the foreign agent 254 may serve as a default router for registered mobile nodes.

A mobile node 260 is given a long-term IP address on a home network. This home address is administered in the same way as a "permanent" IP address is provided to a stationary host. When away from the home network, a "care-of address" is associated with the mobile node 260 and reflects the mobile node's current point of attachment. The mobile node 260 uses the home address as the source address of all IP datagrams that it sends. While away from home, the mobile node 260 registers the care-of address with the home agent 252. Depending on method of attachment, the mobile node 260 will register either directly with its home agent 252, or through a foreign agent 254, which forwards the registration to the home agent 252.

Figure 1D:
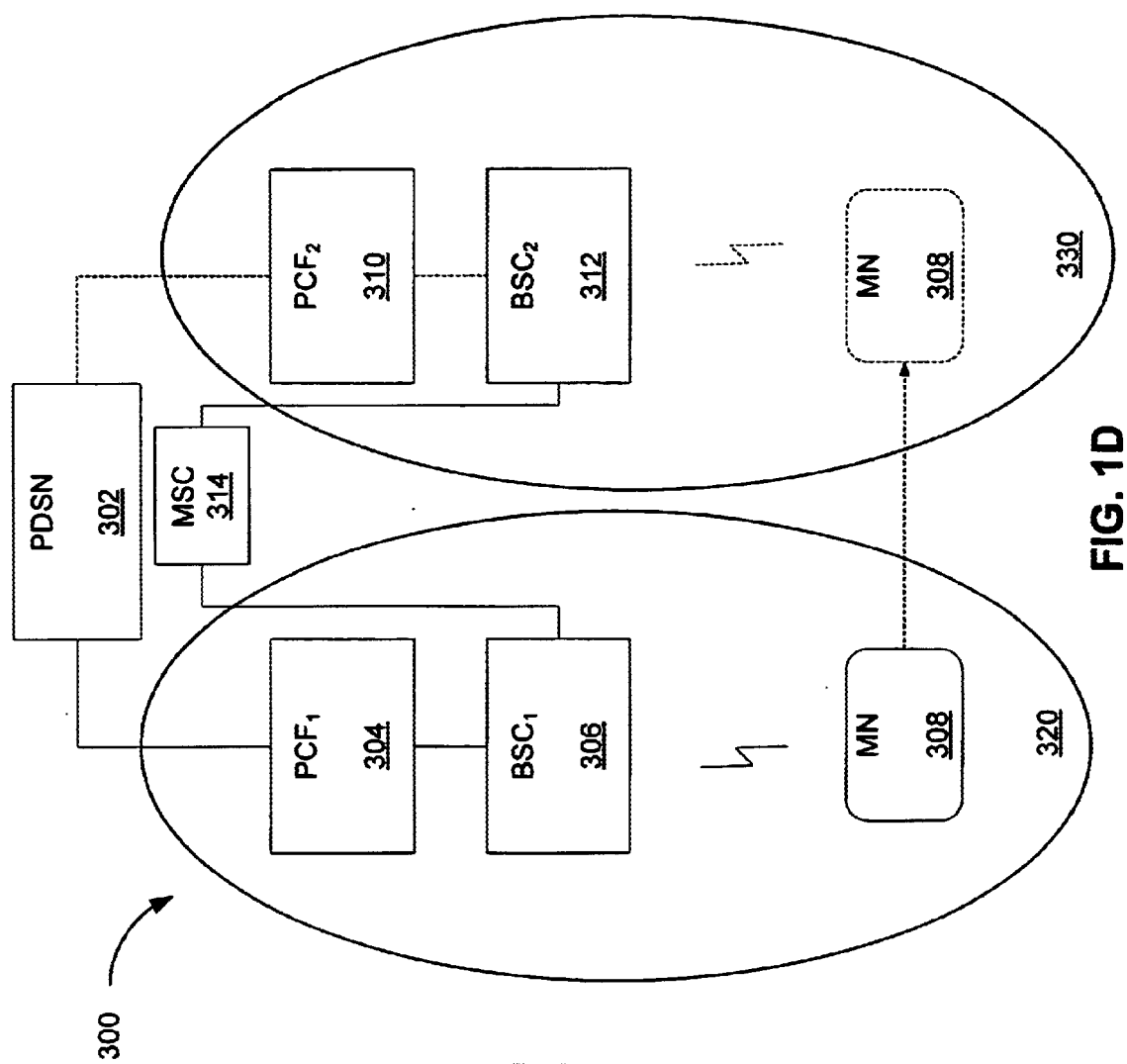
FIG. 1D is a diagram of a portion of a wireless communication system as in FIG. 1B.
Figure 1C:
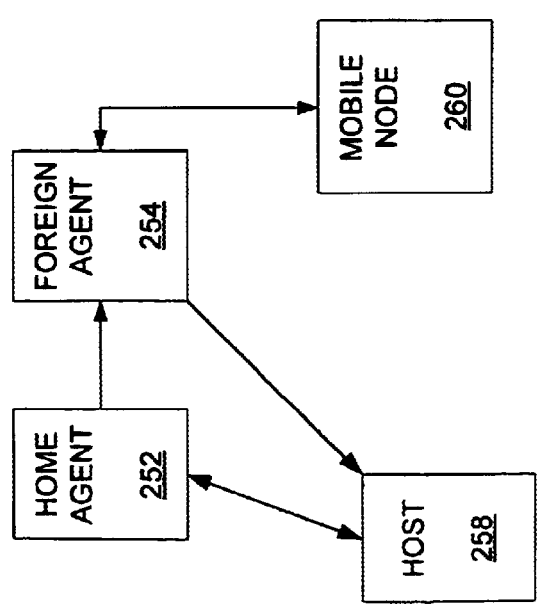
FIG. 1C is a diagram illustrating path flow in a communication system supporting Internet Protocol (IP) communications.

For the system 100 of FIG. 1B, a typical configuration 300 within each Packet Zone IDentifier (PZID) is illustrated in FIG. 1D. A Packet Data Service Node (PDSN) 302 is coupled to Packet Control Function (PCF) Nodes 304 and 310, which are each coupled to Base Station Controllers (BSCS) $BSC_1$ 306 and $BSC_2$ 312, respectively. A first communication path is defined by PDSN 302 to $PCF_1$ 304 to $BSC_1$ 306, wherein the $BSC_1$ 306 communicates with the MN 308 within PZID 320 via an air interface. When the Mobile Node (MN) 308 moves to another PZID, such as PZID 330, a new path is established for packet data communications defined by PDSN 302 to $PCF_2$ 310 to $BSC_2$ 312, wherein the $BSC_2$ 312 communicates with the MN 308 within PZID 320 via an air interface. The path connections from PDSN 302 to $PCF_1$ 304 and $PCF_2$ 310 define A10 connections. The path connections from $PCF_1$ 304 to $BSC_1$ 306 and from $PCF_2$ 310 to $BSC_2$ 312 define A8 connections. A PPP connection is established between the MN 308 and the PDSN 302. If the MN changes PDSN, a new PPP connection is established between the MN and the new PDSN.

For calls supporting packet data services, a Packet Data Serving Node (PDSN) exists that interfaces between the transmission of the data in the fixed network and the transmission of the data over the air interface. The PDSN interfaces to the BS through a Packet Control Function (PCF), which may or may not be co-located with the BS. For the packet data system illustrated in FIG. 1D, an MN 308 may operate in one of at least three states or modes.

Figure 2:
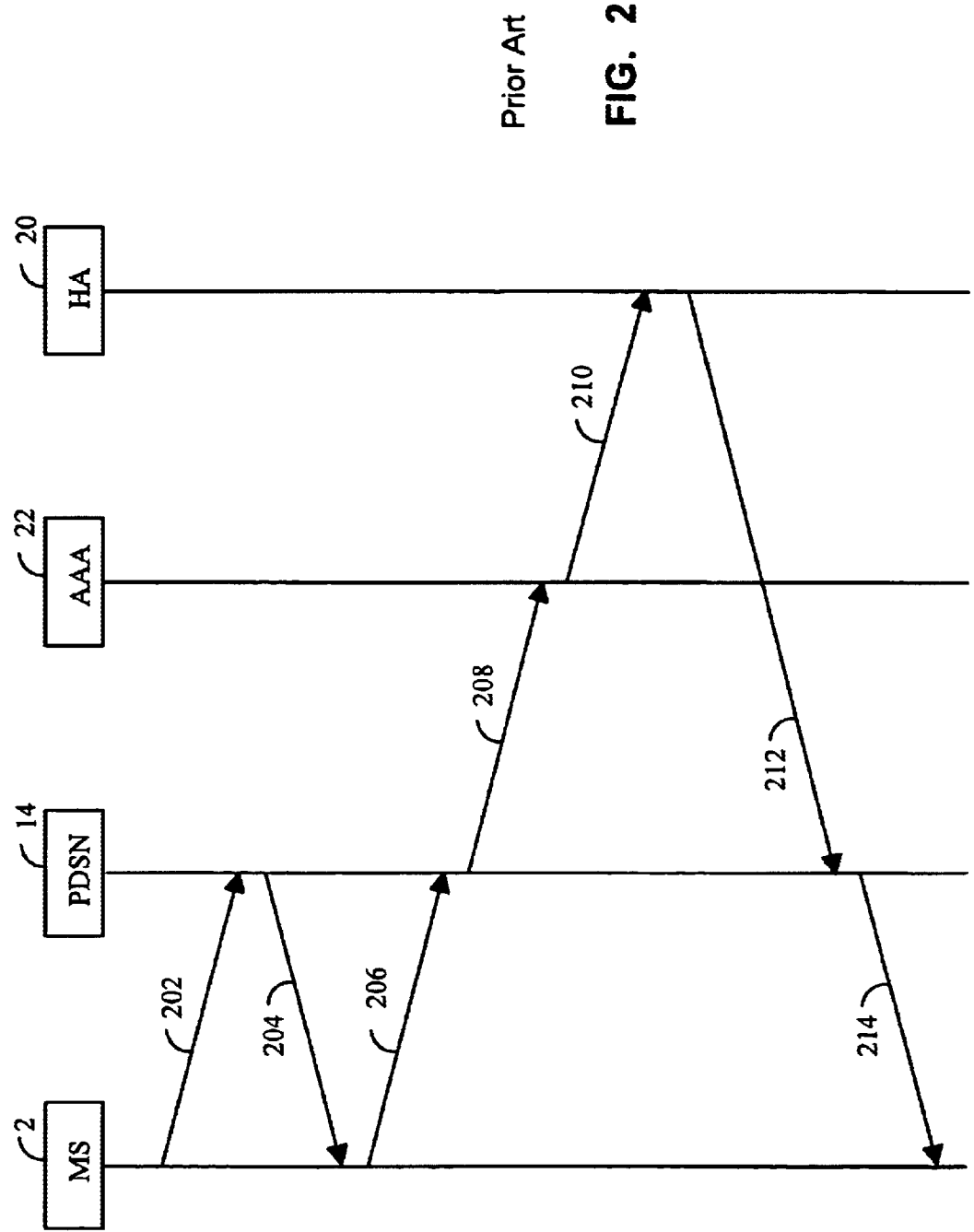
FIG. 2 is a message flow diagram depicting assignment of an IP address to an MS 2 in accordance with the mobile IP standard.

FIG. 2 is a message flow diagram depicting assignment of an IP address to an MS 2 in accordance with the mobile IP standard. First, the MS 2 originates a wireless link to a RAN connected to PDSN 14 and sends a first message 202 through a RAN to the PDSN 14. If the MS 2 has an International Mobile Station Identity (IMSI), the MS 2 sends the IMSI in the first message 202. The first message 202 may be one of several different types, depending on the type of wireless interface supported by the RAN or the connection state of the wireless link between the MS 2 and the RAN. For example, the first message 202 may be an origination message if the MS 2 is not connected to the RAN, or may be an agent solicitation message if the MS 2 is already communicating over a wireless link with the RAN. Though the numbering in the example shown indicates PDSN 14, the first message 202 could also be sent through a RAN connected to another PDSN such as PDSN 16.

In response to the first message 202, the PDSN 14 responds with a message 204 containing an agent advertisement and an authentication challenge. The agent advertisement identifies the address of the foreign agent within the PDSN 14. The authentication challenge is part of a handshake that prevents other network entities from accidentally or maliciously using the network identity to intercept data packets intended for the MS 2. The MS 2 and the authentication, authorization, and accounting server 22 are programmed with shared secret information not available throughout the IP network 18. The shared secret information allows the AAA server 22 to verify the identity of the MS 2 before the MS 2 is allowed to send requests to the HA 20. If authentication with the AM server 22 fails, then the MS 2 cannot request an IP address from the HA 20. In an embodiment, the shared secret takes the form of a user name and a password.

Upon receiving the challenge in the message 204 received from the PDSN 14, the MS 2 uses its shared secret information in combination with the challenge information to form a challenge response that will enable the HA 20 to verify the identity of the MS 2. For example, the MS 2 uses a one-way hashing function to combine the shared secret information with the challenge information. The MS 2 sends a message 206 back to the PDSN 14 containing the challenge information, the challenge response, and a registration request. The PDSN 14 then forwards the three pieces of information to the AAA server 22 in a message 208. Using the same one-way hashing function, the AAA server 22 can verify the shared secret information used by the MS 2, even though the shared secret information itself is never sent through the network. The AAA server 22 can be one of several brands or types. In an embodiment, a Remote Authentication Dial In User Service (RADIUS) server is used.

If the AAA server 22 determines that the challenge response from the MS 2 is valid, the AAA server 22 forwards the registration request 210 to the HA 20. The HA 20 has a pool of available IP addresses that it assigns to mobile network entities such as the MS 2. Any IP packet sent through the IP network 18 bearing a destination address from the HA's 20 pool of addresses are routed by the IP network 18 to the HA 20. Based on the contents of the registration request 210, the HA 20 forms a registration reply 212 containing an IP address to be used as a source address in packets sent by the MS 2 to other network entities. The HA 20 sends the response 212 to the FA in the PDSN 14. The FA records the IP address and associates it with and establishes a RAN-PDSN (R-P) session. In an embodiment, the FA stores the R-P information in a table that is indexed according to IP address. To complete the assignment of the IP address to the MS 2, the PDSN 14 sends a message 214 to the MS 2 through the RAN. The message 214 contains the registration reply from the HA 20 and includes the IP address allocated to the MS 2.

After its IP address has been registered, the MS 2 may begin sending IP packets throughout the IP network 18. For example, the MS 2 may begin communicating with a correspondent node 24, such as a web server. Packets sent by the MS 2 bear the destination address of the correspondent node 24 and the source address assigned to the MS 2. All messages sent by the MS 2 are routed through the FA in the PDSN 14. The FA may send an outgoing packet straight into the IP network 18 or may encapsulate it in a larger packet addressed to the HA 20. If the latter approach is taken, the HA 20 decapsulates the packet received from the PDSN 14 and forwards the decapsulated packet to its destination within the correspondent node 24.

Responses from the correspondent node 24 will bear the destination address assigned to the MS 2 from the address pool belonging to the HA 20. All such messages are routed by the IP network 18 to the HA 20. The HA 20 inspects the destination address of each received IP packet to identify the MS 2 and the associated PDSN 14. Then, the HA 20 encapsulates the packet in a larger packet bearing the destination address of the PDSN 14. The encapsulated packet is received by the FA in the PDSN 14. The FA decapsulates the packet and finds the destination IP address of the decapsulated packet in its R-P table. The FA then forwards the packet through the RAN associated with the corresponding R-P session. To the MS 2, the mobile IP process is transparent except for a bit of added delay for all the encapsulation, decapsulation, and forwarding.

In FIG. 1A, the MS 2 is shown as being located in the coverage area 6 of RAN 32. In FIG. 1A, all the RANs 32, 34, 36 use a 1× type of wireless interface. Networks using a 1× wireless interface use IMSIs to identify mobile stations. An MS 2 establishing a new wireless link sends its IMSI in the origination message. The RAN authenticates the IMSI by exchanging challenge and challenge response messages with a Home Location Register (HLR) (not shown). The HLR is part of a Signaling System 7 (SS7) wireless phone network that is standardized and well known in the art. Authentication of IMSIs is accomplished using techniques similar to the one-way hash function techniques described above in association with mobile IP authentication.

In an embodiment as shown in FIG. 1A, the MS 2 first establishes a connection through a first 1× RAN 32 and registers with the HA 20 as described above in association with FIG. 2. After mobile IP registration is complete, the MS 2 uses an address from the address pool of the HA 20, and sends packets using a PPP state within the FA in PDSN 14.

In a 1× system, PDSN 14 identifies the MS 2 by its IMSI. Within the coverage area 6 of RAN 32, the MS 2 monitors overhead messages broadcast from base stations in RAN 32. Among other types if information, those overhead messages identify the packet zone ID of RAN 32.

When the MS 2 leaves the coverage area 6 of RAN 32 and enters the coverage area 8 of RAN 34, the MS 2 decodes the overhead messages broadcast by the base stations in RAN 34. The RAN overhead messages contain a different PZID than that broadcast by base stations in RAN. When the MS 2 detects the change in the PZID, it sends a "fake origination" to RAN 34. In an embodiment, the origination message contains the IMSI of the MS 2, a Data Ready to Send (DRS) field, and a PREV_PZID field. Because the origination is primarily for route updating purposes, the DRS field is set to 0, indicating that the MS 2 does not have packet data to send. If the MS 2 happens to have new packet data to be sent to the network, it may originate a regular call using an origination having a 1 in the DRS field. The PREV_PZID field contains the PZID of the previous system to which the MS 2 was connected. RAN 34 receives the origination and forwards the IMSI and the PREV_PZID of the MS 2 to its serving PDSN, PDSN 14. PDSN 14 determines from the IMSI that the MS 2 has an existing PPP state within the PDSN 14, and determines from the PREV_PZID value that the MS 2 came from RAN 32. Because the PDSN is connected to both the original RAN 32 and the destination RAN 34, the PDSN can generally just redirect the same PPP state to the destination RAN 34. If, for some reason, PDSN 14 cannot redirect the same PPP state to the destination RAN 34, PDSN 14 resets its PPP state and forces the MS 2 to establish a new PPP session.

When the MS 2 leaves the coverage area 8 of RAN 34 and enters the coverage area 10 of RAN 36, the MS 2 decodes the overhead messages broadcast by the base stations in RAN 36. The RAN 36 overhead messages contain a different PZID than broadcast by base stations in RAN 34. When the MS 2 detects the change in the PZID, it sends a "fake origination" to RAN 36 containing the IMSI of the MS 2, a DRS field having a value of 0, and a PREV_PZID field identifying the PZID of the previous RAN, RAN 34. RAN 36 receives the origination and forwards the IMSI and the PREV_PZID of the MS 2 to its serving PDSN, PDSN 16. Depending on whether the MS 2 had previously been connected to PDSN 16, PDSN 16 may have a PPP state associated with the IMSI of the MS 2. Regardless of the existence of a previous PPP state, PDSN 16 determines from the PREV_PZID value that the MS 2 came from a RAN connected to a different PDSN. PDSN 16 cannot retrieve a PPP state from a different PDSN, and is consequently required to establish a new PPP session with the MS 2. If PDSN 16 had a previous PPP session set up with the MS 2, this means that PDSN 16 must discard that PPP session.

After a new PPP session is established between the MS 2 and PDSN 16, PDSN 16 sends an agent advertisement message to the MS 2 identifying the address of the FA within PDSN 16. Because the address of each FA is different, the FA address of PDSN 16 will be different than the FA address of PDSN 14. When the MS 2 receives an agent advertisement having a different address, the MS determines that it must re-register its IP address with the HA 20. The MS 2 re-registers its IP address with the HA 20, for example according to the protocol described in association with FIG. 2. Using mobile IP authentication as described above, the HA 20 recognizes that the MS 2 has moved and is requesting the same IP address. If possible, the HA 20 allocates the same IP address to the MS 2 and redirects messages destined for that address to PDSN 16. Generally, the HA 20 does not send notification of the redirection to the original PDSN, PDSN 14.

Figure 3:
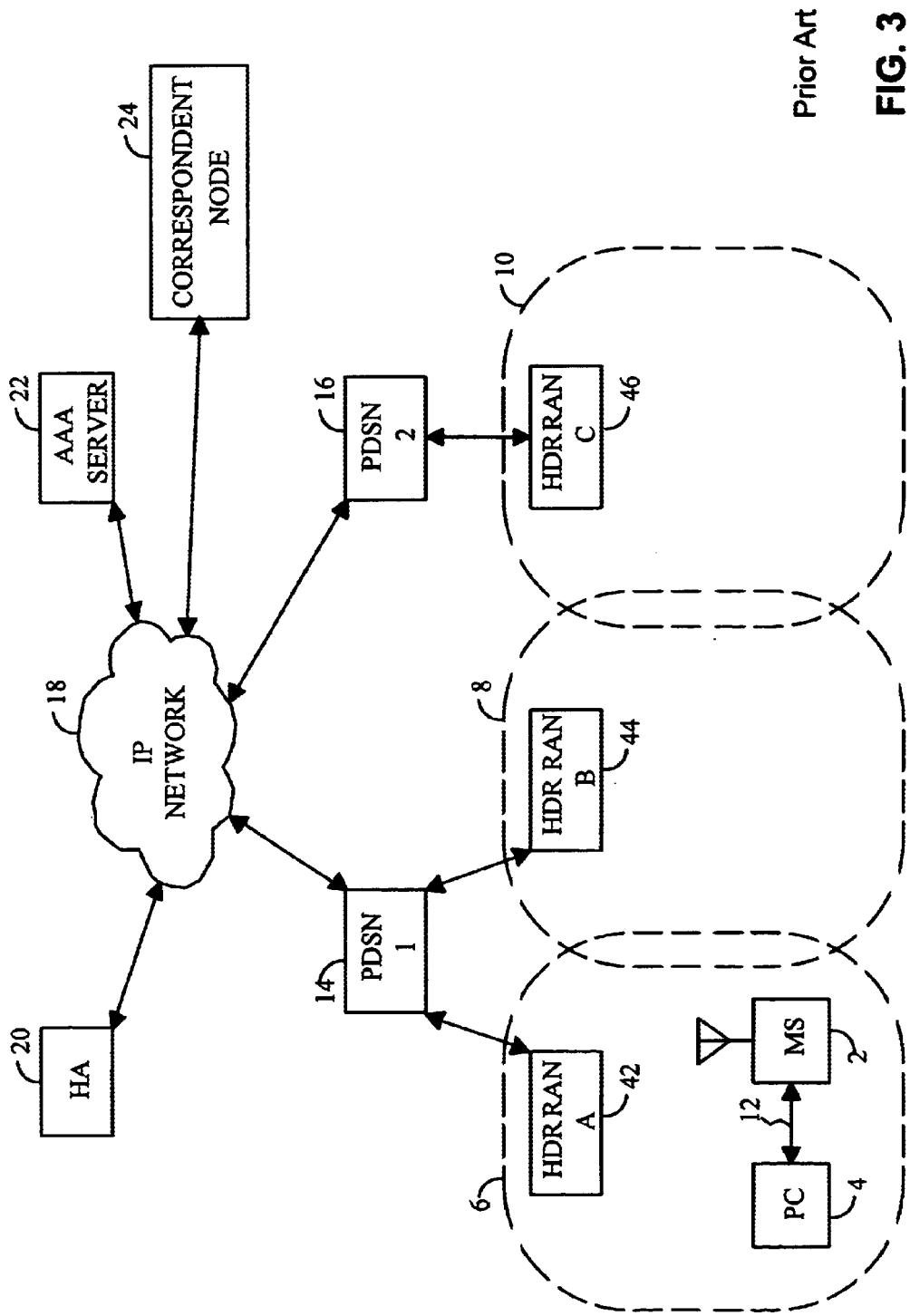
FIG. 3 is a diagram of a wireless system configuration using only HDR radio access networks (RANs).

FIG. 3 depicts a network configuration in a system using only HDR RANs 42, 44, 46. The MS 2 is initially located in the coverage area 6 of RAN 42. In FIG. 3, all the RANs 42, 44, 46 use an HDR type of wireless interface. Networks using an HDR wireless interface use Unicast Access Terminal Identifiers (UATIs) to identify mobile stations.

An HDR RAN generally does not obtain an IMSI from an MS 2, but assigns an IMSI to each MS 2 primarily to allow identification of R-P sessions with a PDSN. By providing some IMSI support, an HDR network can use the same kind of PDSN used by 1× systems. In general, a strictly HDR network does not perform any IMSI authentication, and is not connected to an SS7 wireless phone network. As illustrated, IP network 18 communicates with AAA server 22, PDSNs 14, 16, HA 20, and correspondent node 24.

The MS 2 connects to an HDR system through a first HDR RAN, for example RAN 42, and obtains a UATI from RAN 42. RAN 42 then assigns a temporary IMSI to the MS 2 in order to enable packet data to be routed by the FA in PDSN 14. Alternatively, if RAN 42 is capable of authenticating the IMSI, RAN 42 assigns the actual IMSI to the MS 2 in establishing the R-P link with PDSN 14. If RAN 42 is capable of authenticating the IMSI, it may do so using an Authentication Center on an SS7 network or using the AAA server 22. The MS 2 then registers with the HA 20 as described above in association with FIG. 2. After mobile IP registration is complete, the MS 2 uses the IP address assigned to it by the HA 20, and sends packets using a PPP state within the FA in PDSN 14. Within the coverage area 6 of RAN 42, the MS 2 monitors overhead messages broadcast from base stations in RAN 42. In an embodiment, the overhead messages include information that enables the MS 2 to determine when it is located within the coverage area 6 associated with base stations of RAN 42. The overhead messages that allow the MS 2 to identify the RAN associated with a coverage area are referred to as a subnet mask. When the MS 2 leaves one coverage area and enters another, the subnet mask received on the overhead channels will change accordingly.

When the MS 2 leaves the coverage area 6 of RAN 42 and enters the coverage area 8 of RAN 44, the MS 2 decodes the overhead messages broadcast by the base stations in RAN 44. When the MS 2 detects the change in the subnet mask, it sends a UATI Update message to RAN 44. The UATI Update message contains the UATI assigned to the MS 2 by RAN 42. RAN 44 determines that the UATI was assigned by some other RAN, and queries other HDR RANs connected to the same network for the UATI. As described above, a database of UATIs, PPP state information, IMSIs, and other information is distributed among HDR RANs in a wireless network. Based on the previously assigned UATI, RAN 42 obtains the table information associated with the MS 2. Because both RAN 42 and RAN 44 are connected to PDSN 14, RAN 44 determines the temporary IMSI associated with the MS's 2 UATI and notifies PDSN 14 that the MS 2 associated with that IMSI has moved to RAN 44.

When the MS 2 leaves the coverage area 8 of RAN 44 and enters the coverage area 10 of RAN 46, the MS 2 decodes the overhead messages broadcast by the base stations in RAN 46. The RAN 46 overhead messages contain a different subnet mask than broadcast by base stations in RAN 44. When the MS 2 detects the change in the subnet mask, it sends a UATI Update message to RAN 46 containing the MS's 2 previously assigned UATI. RAN 46 receives the UATI Update message and queries other RANs connected to PDSN 16 to determine whether the MS 2 received its UATI assignment from a nearby RAN. Because the MS 2 received its UATI assignment in RAN 44, which is connected to PDSN 14, RAN 46 will be unable to redirect the PPP state to itself. RAN 46 therefore assigns a new UATI to the MS 2 and forces the MS 2 to establish a new PPP session. The MS 2 will consequently lose state information associated with its previous PDSN 14 PPP session.

After a new PPP session is established between the MS 2 and PDSN 16, PDSN 16 sends an agent advertisement message to the MS 2 identifying the address of the FA within PDSN 16. Because the address of each FA is different, the FA address of PDSN 16 will be different than the FA address of PDSN 14. When the MS 2 receives an agent advertisement having a different address, the MS determines that it must re-register its IP address with the HA 20. The MS 2 re-registers its IP address with the HA 20, for example according to the protocol described in association with FIG. 2. Using mobile IP authentication as described above, the HA 20 recognizes that the MS 2 has moved and is requesting the same IP address. If possible, the HA 20 allocates the same IP address to the MS 2 and then redirects messages destined for that address to PDSN 16. Generally, the HA 20 does not send notification of the redirection to the original PDSN, PDSN 14.

Figure 4:
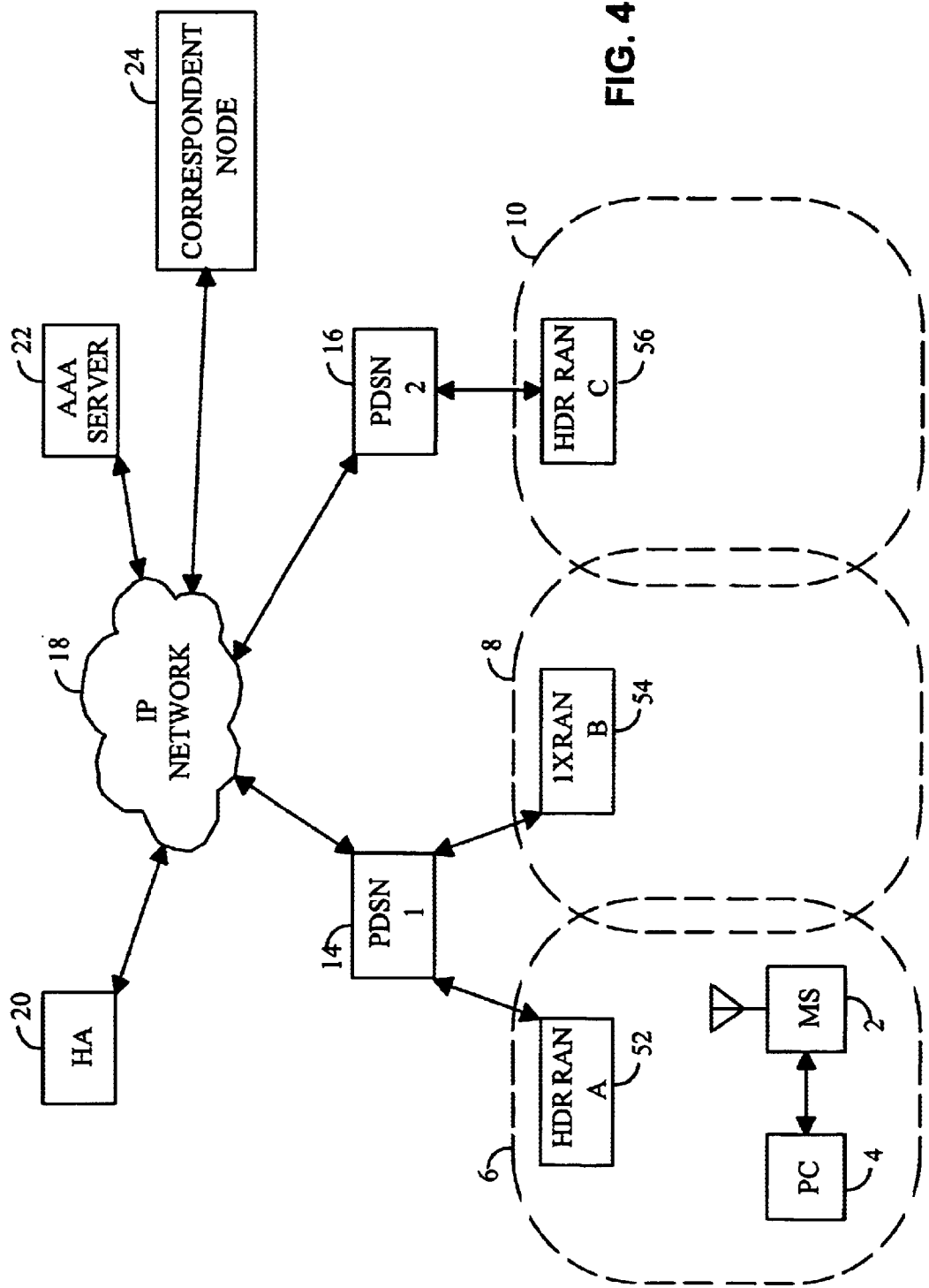
FIG. 4 is a diagram of a wireless system configuration using 1× and HDR radio access networks (RANs).

FIG. 4 depicts a network configuration in a system using a mixture of HDR RANs 52, 56 and 1× RANs 54. The MS 2 is initially located in the coverage area 6 of RAN 52. An MS 2 designed to operate in a mixed HDR and 1× system has attributes of both systems. For example, it has an IMSI stored in memory, but is also programmed to connect to an HDR network using a UATI.

If HDR RANs 52, 56 are capable of performing authentication of IMSIs, then R-P links with PDSNs 14 and 16 can be established using the actual IMSI of the MS 2. IMSI authentication may be accomplished by an HDR RAN using an Authentication Center on an SS7 network or using the AAA server 22. In an embodiment, the MS 2 sends its IMSI to an HDR RAN at the beginning of HDR session negotiations. Each HDR RAN 52, 56 can then use the true IMSI of the MS 2 to establish its R-P links with PDSNs 14 and 16. Because the same IMSI is used for both the 1× RAN 54 and the HDR RANs 52, 56, the PDSN can easily resolve any routing ambiguity and avoid mis-routing any packets addressed to the MS 2. Furthermore, if the previous 1' RAN and the destination HDR RAN share a single PDSN, for example in a configuration similar to that of RAN 52, RAN 54, and PDSN 14, the PDSN can re-route its R-P connection to the destination RAN and re-use the existing PPP state.

However, if HDR RANs 52 and 56 are not capable of authenticating IMSIs, they will create temporary IMSIs for use in R-P links with PDSNs 14 and 16. A subsequent handoff from a 1× RAN to an HDR RAN, for example from RAN 54 to RAN 52, can cause routing problems in a shared PDSN such as PDSN 14. In an embodiment, routing problems caused by the creation of multiple R-P sessions having the same IP address but different IMSIs are addressed with minor modifications to PDSN operation.

In an embodiment, the MS 2 connects to an HDR system RAN 52, and obtains a UATI from RAN 52. RAN 52 then assigns a temporary IMSI to the MS 2 in order to enable packet data to be routed by the FA in PDSN 14. The MS 2 then registers with the HA 20 as described above in association with FIG. 2. After mobile IP registration is complete, the MS 2 uses the IP address assigned to it by the HA 20, and sends packets using a PPP state within the FA in PDSN 14. Within the coverage area 6 of RAN 52, the MS 2 monitors overhead messages broadcast from base stations in RAN 52.

When the MS 2 leaves the coverage area 6 of RAN 52 and enters the coverage area 8 of RAN 54, the MS 2 decodes the overhead messages broadcast by the base stations in RAN 54. As discussed above, a 1× RAN like RAN 54 broadcasts a PZID on its overhead channels. So, the MS 2 receives a subnet mask from RAN 52 and a PZID from RAN 54. From the different overhead messages received from RAN 54, the MS 2 determines that it has moved into coverage of a network having a different type of wireless interface. As explained below, the MS 2 and PDSN 14 must take special precautions to prevent packets destined for the MS 2 from being lost due to routing ambiguity.

In response to the change of network, the MS 2 sends to RAN 54 a "fake origination" containing the actual IMSI of the MS 2. As a result, RAN 54 establishes a new R-P connection with PDSN 14 based on the actual IMSI of the MS 2. If PDSN 14 has not previously established a PPP state with the MS 2 based on the actual IMSI, then PDSN 14 negotiates a new PPP state with the MS 2. After a new PPP session is established between the MS 2 and PDSN 14, PDSN 14 sends an agent advertisement message to the MS 2 identifying the address of the FA within PDSN 14. Because the PDSN has not changed, the FA address sent in the agent advertisement message will be the same as that received from RAN 52. As a result, the MS 2 may not re-register its IP address with the HA 20. Because the MS 2 obtained its IP address from HA 20 through RAN 52, RAN 52 assigned a temporary IMSI to the MS 2. The IP address being used by the MS 2 is linked to the temporary IMSI in the FA within PDSN 14. All network packets arriving at the FA in PDSN 14 bearing that IP address will be routed to RAN 52 unless the MS 2 re-registers its IP address with the HA 20.

In an embodiment, the MS 2 performs mobile IP re-registration whenever it moves from the coverage area of an HDR RAN 52, 56 into the coverage area of a 1× RAN 54. For example, if the MS 2 moves from the coverage area 6 of RAN 52 to the coverage area 8 of RAN 54, the MS 2 reregisters its address with the HA 20 even if the FA address received in the agent advertisement message is the same as the one used immediately prior.

Unfortunately, re-registering with the HA 20 does not entirely solve the routing ambiguity. When the MS 2 first obtains its IP address from the HA 20 through RAN 52, the foreign agent in PDSN 14 associates an R-P session with the combination of temporary IMSI and IP address used. After the MS 2 moves into the coverage area of RAN 54, the MS 2 re-registers with the HA 20 and is generally allocated the same IP address. Unfortunately, the re-registration uses the actual IMSI of the MS 2 instead of the temporary IMSI initially assigned by RAN 52. Consequently, PDSN 14 will end up having the same IP address assigned to two different R-P sessions, each corresponding to a different IMSI. When a packet arrives from the IP network 18 bearing that IP address, PDSN 14 will be unable to unambiguously route the packet to a RAN.

In an embodiment, the PDSNs in a mixed network are modified to prevent such ambiguity. Any time the FA assigns an IP address to an IMSI, the FA purges its tables of any other entries bearing the same IP address, regardless of the value of the IMSI. Only one R-P session per IP address is allowed within an FA of a PDSN.

In addition to the case where an MS 2 moves from an HDR system to a 1× system, special precautions must be taken to avoid routing ambiguity when the MS 2 moves from a 1× system to an HDR system. The problems may be particularly acute when an MS 2 establishes a connection through an HDR RAN, such as RAN 56, then moves to a 1× RAN such as RAN 54, served by a different PDSN, re-registers its IP address with the HA 20 while in RAN 54, and then returns to RAN 56. In the currently proposed HDR standards, there is no way for an MS 2 to notify the RAN 56 that it has just come from a system that uses a different wireless interface or that it has re-registered its IP address in the other system. This is not a problem when moving from a 1× RAN to a 1× RAN, because the PREV_PZID in the fake origination allows the PDSN to determine that the MS 2 re-registered through a different PDSN. This is also not a problem when moving from an HDR RAN to an HDR RAN, because the UATI in the UATI Request allows the destination PDSN to determine whether the MS 2 re-registered through a different PDSN.

When the MS 2 reenters the coverage area 10 of HDR RAN 56 from 1× RAN 54, the MS 2 sends a UATI Request containing the UATI used by the MS 2 when previously in the coverage area 10 of HDR RAN 56. The MS 2 has no way, using the currently proposed protocols, to notify HDR RAN 56 of its re-registration in the intervening 1× system. Consequently, RAN 56 will resume network communications using the existing PPP state in PDSN 16 associated with the UATI used previously by the MS 2.

In an embodiment, the MS 2 always resets its UATI upon moving from a 1× RAN to an HDR RAN. When the reset UATI is sent in the UATI Request, the HDR RAN will assign a new UATI to the MS 2 and thus force a mobile IP re-registration. The mobile IP re-registration will generally result in the MS 2 being assigned the same IP address it was using previously. Upon completion of the mobile IP re-registration, the HA 20 will properly direct network packets to the HDR RAN, and to the MS 2. In an alternate embodiment, the MS 2 accomplishes substantially the same thing by simply forcing a PPP reset whenever the MS 2 moves from a 1× RAN to an HDR RAN.

In another embodiment, the HDR standard is altered to allow the MS 2 to initiate a LocationNotification message to the HDR RAN. In the existing HDR specification, the LocationNotification message may contain the system identifier (SID), network identifier (NID), and PZID of the previous system in which the MS 2 re-registered its IP address. Armed with this information, the HDR RAN could query its PDSN to possibly shift the R-P session to the HDR RAN. Or, if the PZID belongs to a 1× RAN associated with a different PDSN, the PDSN can reset the PPP session and thus trigger an IP address re-registration.

In another embodiment, the MS 2 sends a mobile IP AgentSolicitation message to the FA in the destination PDSN. Based on the address of the FA gleaned from the response, the MS 2 can re-register its IP address with the HA 20 without expending the bandwidth necessary to establish a new PPP session.

Figure 5:
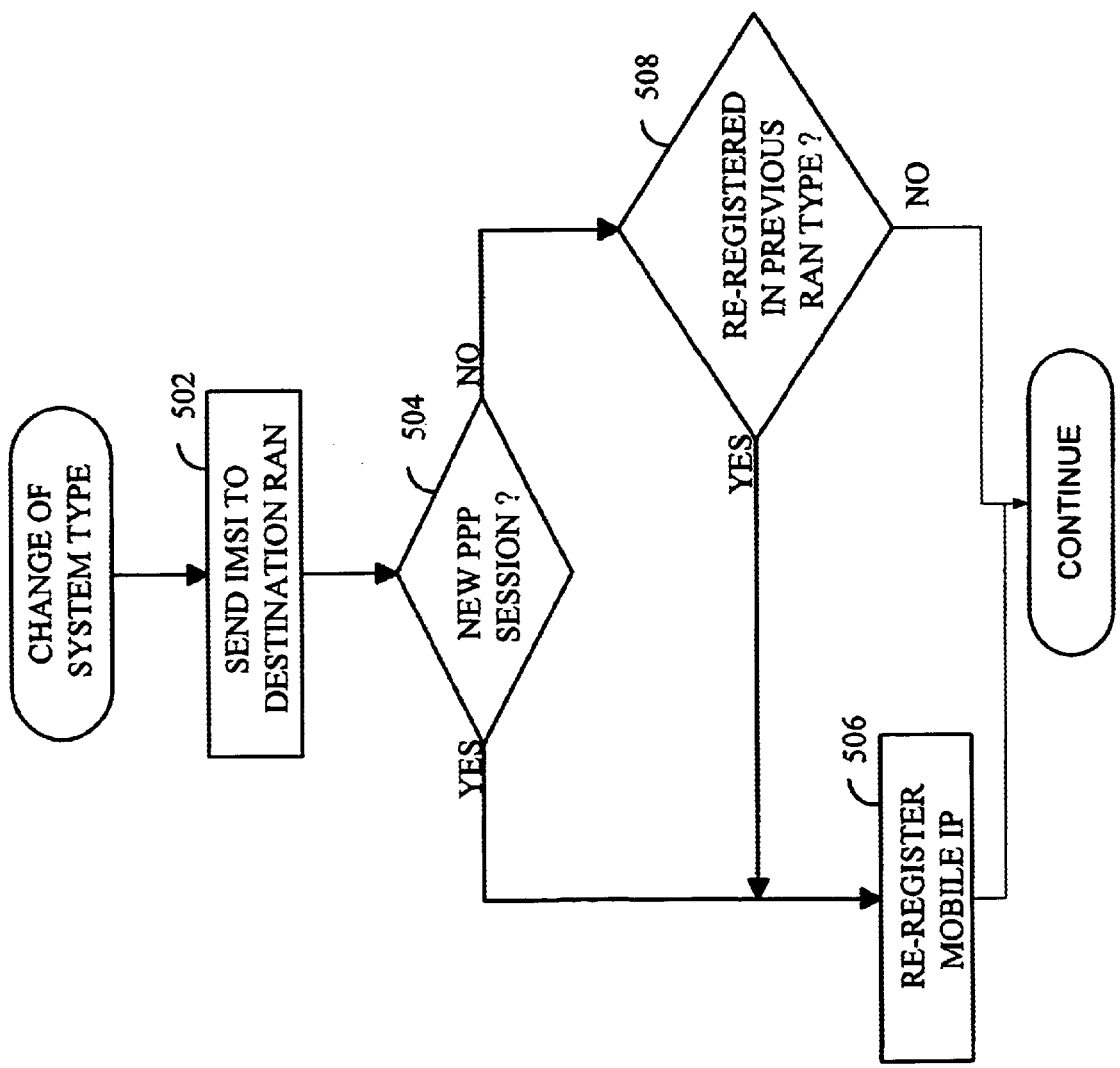
FIG. 5 is a flowchart showing a process used by an MS when handing off between a 1× RAN and an HDR RAN capable of performing International Mobile Station Identity (IMSI) authentication.

FIG. 5 is a flowchart showing a process used by the MS 2 when handing off between a 1× RAN and an HDR RAN capable of performing IMSI authentication. Upon detecting a change of RAN type, the MS 2 sends its IMSI to the destination RAN at step 502. If the destination RAN is a 1× RAN, the IMSI may be sent in the origination message for a "fake origination." If the destination RAN is an HDR RAN, the IMSI may be sent in a configuration message while the new HDR session is being negotiated.

If the PDSN connected to the destination RAN does not have an R-P session associated with the IMSI of the MS 2, the PDSN will establish a new PPP session with the MS 2. At step 504, the MS 2 determines whether a new PPP session has been established with the PDSN. The establishment of a new PPP session by the PDSN could mean that the PDSN has no existing PPP state associated with the IMSI of the MS 2. Alternatively, the establishment of a new PPP session by the PDSN could mean that the PDSN cannot transfer an existing PPP state from an R-P session of a previous RAN to the destination RAN. In either case, the PDSN will generally send an agent advertisement message to the MS 2 indicating the address of the FA within the PDSN. If the previous RAN providing service to the MS 2 was connected to the same PDSN, then it might not be necessary to re-register mobile IP with the HA 20. The HA 20 would forward packets to the correct PDSN. However, if the previous RAN providing service to the MS 2 was connected to a different PDSN, then the MS 2 should re-register mobile IP in order to notify the HA 20 of the new PDSN address. Because the MS 2 cannot determine whether the new PPP state was necessitated by a change of PDSN, the MS re-registers its mobile IP address with the HA 20 at step 506.

If, at step 504, the MS 2 determines that no new PPP session has been established with the PDSN, then the MS 2 determines, at step 508, whether a mobile IP re-registration occurred in the previous RAN type. As discussed above, protocols used with the different wireless interfaces are designed to manage movement of the MS 2 among different RANs of the same type. Thus, when the MS 2 moves among RANs of the same type, no routing ambiguity results. When moving among 1x RANs, the MS 2 sends information about the previous RAN such as the PZID to allow the destination RAN to determine whether a new PPP session should be established. When the MS 2 is moving among HDR RANs, the destination RAN determines whether a new PPP session is needed by comparing the UATI received from the MS 2 in a UATI update message.

If the previous RAN and the destination RAN are connected to different PDSNs, and the MS 2 re-registered its mobile IP address with the HA 20 in the previous system, the HA 20 will still send subsequent packets addressed to the MS 2 to the previous RAN's PDSN. In order to prevent such routing ambiguity, if the MS 2 performed a mobile IP re-registration in the previous RAN type, it re-registers its mobile IP address at step 506.

In a wireless communication system supporting the IS-856 standard, and the interim standard entitled "cdma2000 High Rate Packet Data Air Interface Specification," identified as TIA/EIA/IS-856-1, dated January 2002, referred to herein as the "HRPD standard," an access network is defined as the network equipment providing data connectivity between a packet switched data network (typically the Internet) and the access terminals. An access network is approximately the equivalent to a base station. An access terminal is defined as a device providing data connectivity to a user. An access terminal may be connected to a computing device such as a laptop personal computer or it may be a self-contained data device such as a personal digital assistant. An access terminal is approximately equivalent to a mobile station.

An AT communicates with the AN via a radio link according to a Radio Link Protocol (RLP). The Location Update Protocol defines location update procedures and messages for mobility management. A location parameter describes the current configuration of the communication path facilitating communication with the AT in the AN. The location parameter includes a triplet of information given as <SID, NID, PACKET_ZONE_ID>. The AN may send a location assignment message to the AT to update the location information. Else, the AN may send a location request message to query location information from the AT. The AT sends a LocationNotification message either in response to a request from the AN or independently. The LocationNotification message includes a Location Value (LV). The LV includes the fields illustrated in Table 1. <Note that the LocationNotification is only one type of location value that corresponds to the ANID in 1x. For example, the LV in HDR does not have the sub-fields, but rather is a number.

TABLE 1

| Subfields of LocationValue | |
|---|---|
| Sub-fields of LB | Number of bits |
| SID | 15 |
| Reserved | 1 |
| NID | 16 |
| PACKET_ZONE_ID | 8 |

The LV is a number that is passed by the network to the mobile and is used by the network to determine whether or not the mobile has established a PPP session with another PPP. The LV is also referred to as the Access Network ID (ANID). The LV that the mobile reports is used by the PCF to populate the PANID field in an A11-Registration Request. CANID is a field provided by the PCF (not the mobile) to the PDSN.

The AN sends location assignment messages when the AT moves to an area wherein communication to the AT is facilitated by at least one different AN infrastructure element and the new communication path is not able to reach the serving PDSN. In this situation, the AN sets the LV to a number that corresponds to the serving PDSN, wherein the number is globally unique. The AN does not continuously advertise the location parameter; nor does the AN update the location parameter each time an AT movement results in a new communication path e.g., crossing a PCF boundary. The radio session for each mobile contains the address of the PDSN. The radio session information can be exchanged between ANs via the A13 interface. The Session Information Response message is specified in TIA/EIA/IS-878 entitled "InterOperability Specification (IOS) for High Rate Packet Data (HRPD) Access Network Interfaces." In this way, retrieving the radio session information from the Session Information Response message indicates to the AN whether or not there is a new serving PDSN. The update is made using the IP address of the previous serving PDSN as included in the Session Information Response message.

Figure 6:
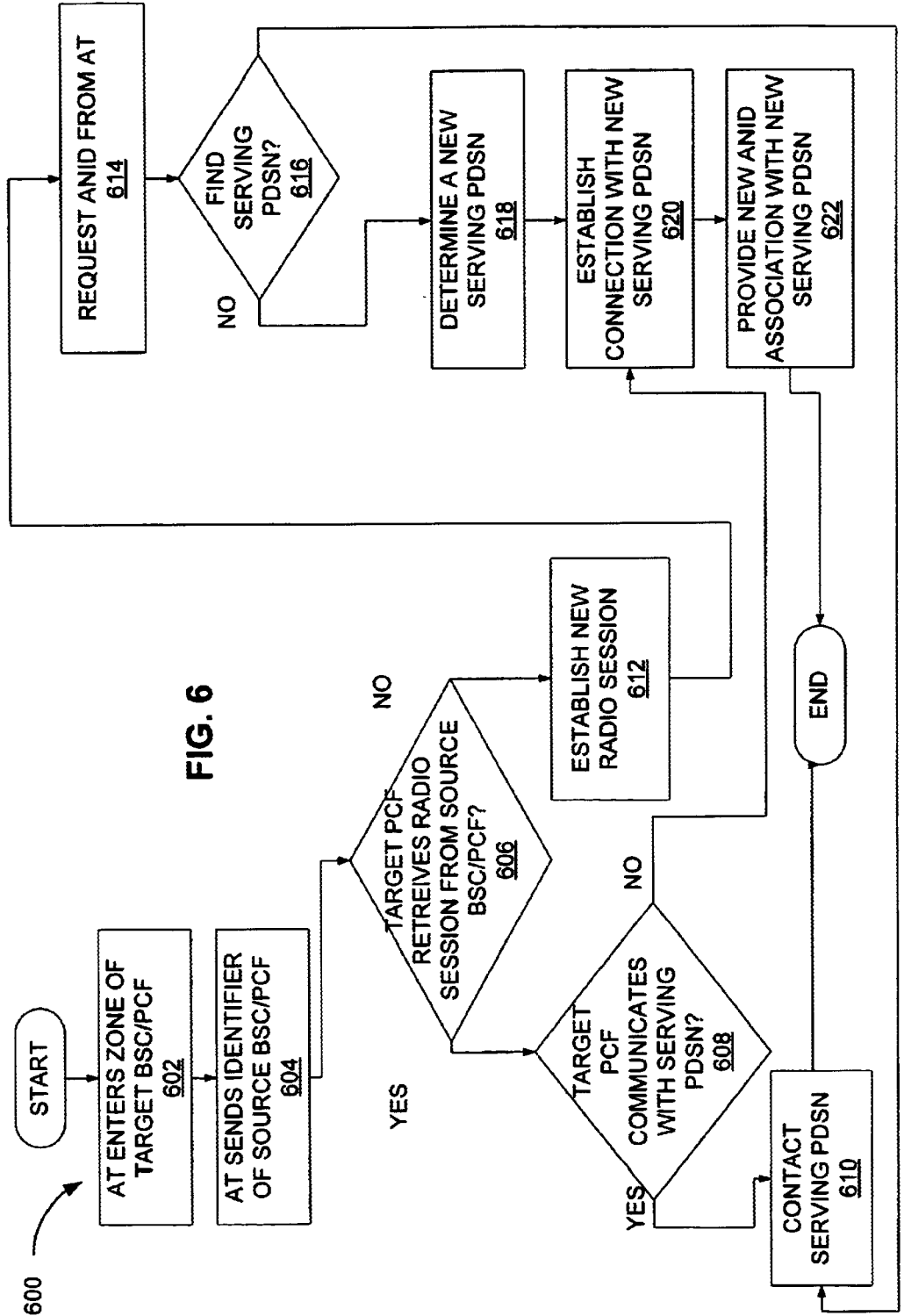
FIG. 6 is a message flow diagram depicting updating of a location parameter for an Access Node in a wireless communication system.

When the AN is not able to reach the previous serving PDSN, a new data session (e.g., PPP) is initiated. A flow chart illustrating the processing at the PCF is provided in FIG. 6. As illustrated, the AT enters the zone of a target BSC/PCF at step 602. The AT sends an identifier of the source BSC/PCF, i.e., previous BSC/PCF, at step 604. At decision diamond 606, the target BSC/PCF, i.e., new BSC/PCF, attempts to retrieve the radio session from the source BSC/PCF. If it is possible to retrieve the radio session and it is possible for the target PCF to communicate with the serving PDSN, (decision diamond 608), then the target BSC/PCF contacts the serving PDSN 610. Else, if the target BSC/PCF is not able to retrieve the radio session, then the BSC/PCF establishes a new radio session at step 612. Processing continues to step 614 to request the ANID from the AT. If the target BSC/PCF is able to find the serving PDSN processing continues to step 616. Else, the PCF determines a new serving PDSN at steps 618 and 620. The location information is then provided to the AT at step 622.

Figure 7:
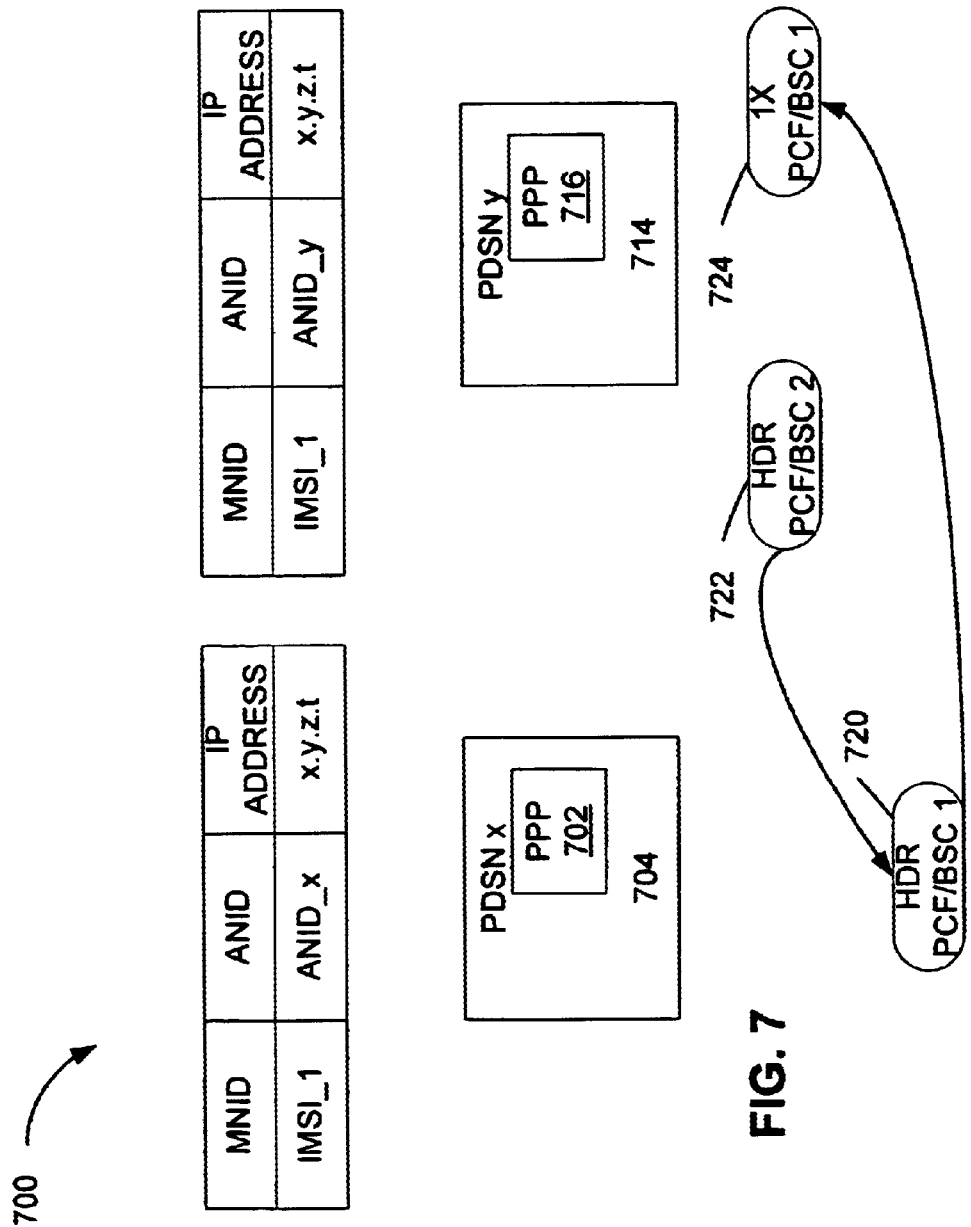
FIG. 7 is a flow chart illustrating updating of a location parameter at each PCF in a wireless communication system.

FIG. 7 illustrates one scenario, wherein the AT has established a PPP session with the serving PDSN. As illustrated, PDSN x 704 includes a PPP session unit 702. The BSC/PCF 720 supports the HRPD standard and is within the serving area of the PDSN x 704. The system 700 further includes PDSN y 714, which includes PPP session unit 716. The BSC/PCF 722 supports the HRPD standard and is within the serving area of the PDSN y 714. The PCF 724 supports a system such as 1x and is within the serving area of PDSN y 714.

When the AT moves to a location where it cannot reach the serving PDSN y, the AN sends a LocationAssignment message and updates the LV stored by the AT. When the AT moves from the serving area of PCF 722 to the serving area of PCF 720, the PCF 722 sends a location assignment message with an LV equal to ANID_x to the AT. The Mobile Node ID (MNID) is identified as IMSI_1, and the IP address of the PDSN is given as x.y.z.t. When the AT moves from the serving area of PCF 722 to the serving area of PCF 724, the AT reports the ANID_x to the PCF 724. In response the PCF 724 reports the ANID_x as the PANID to the PDSN y 714. The PDSN y 714 compares the values of the ANID and the PANID and sends a mobile IP Agent advertisement and initiates LCP configuration when the ANID and PANID do not match.

The AT will generally maintain the last LV received from the network where the data session is established. In other words, if the AT tunes to a 1x frequency, such as in responding to a voice page, and then tunes back to the HRPD frequency, wherein no data session is established in the 1x system, there is no need to change the LV.

Figure 8:
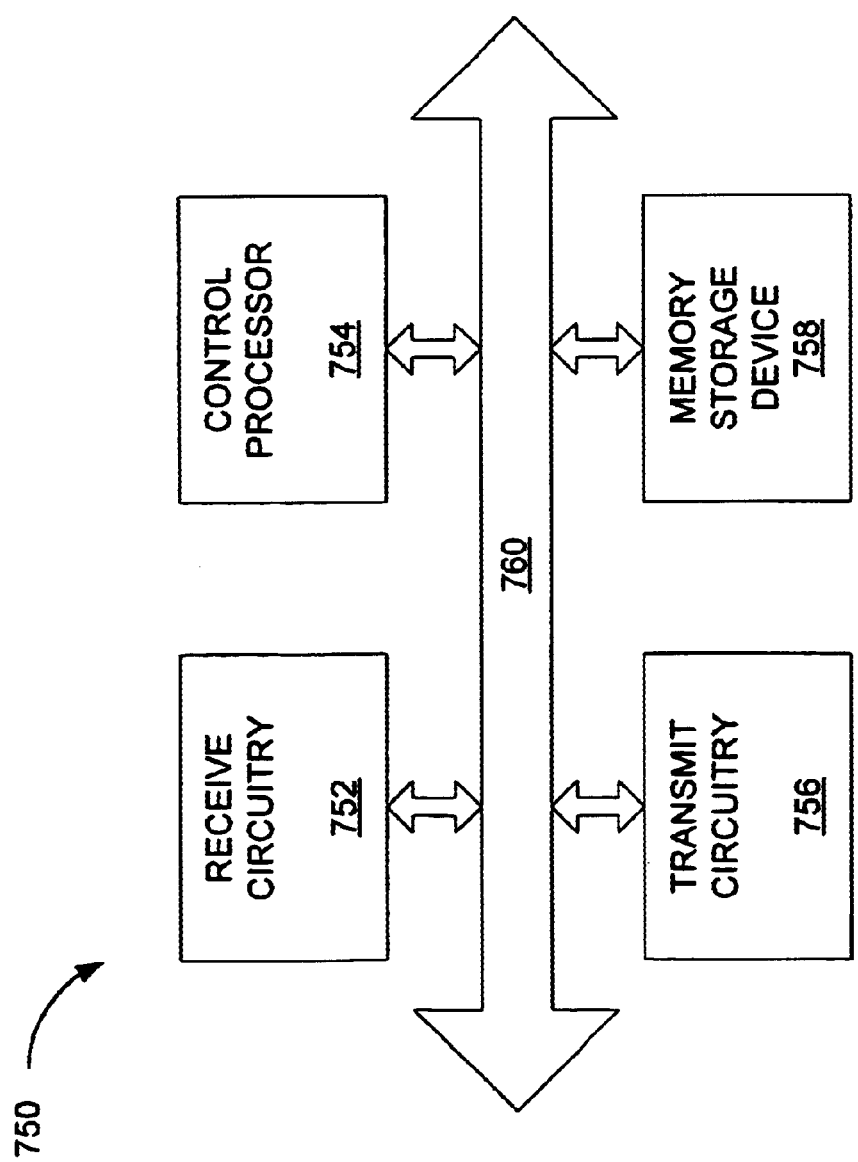
FIG. 8 is a block diagram of an Access Terminal (AT).

FIG. 8 illustrates an AT 750 having receive circuitry 752, transmit circuitry 756, control processor 754, and memory storage device 758, wherein LV information is stored in memory storage device 758. The various modules of AT 750 communicate via a communication bus 760. The LV information stored is a function of the serving PDSN rather than the serving PCF. In this way, the AT 750 receives access network information corresponding to the serving PDSN. The AT 750 does not need to receive access network information for each change of serving PCF.

Figure 9:
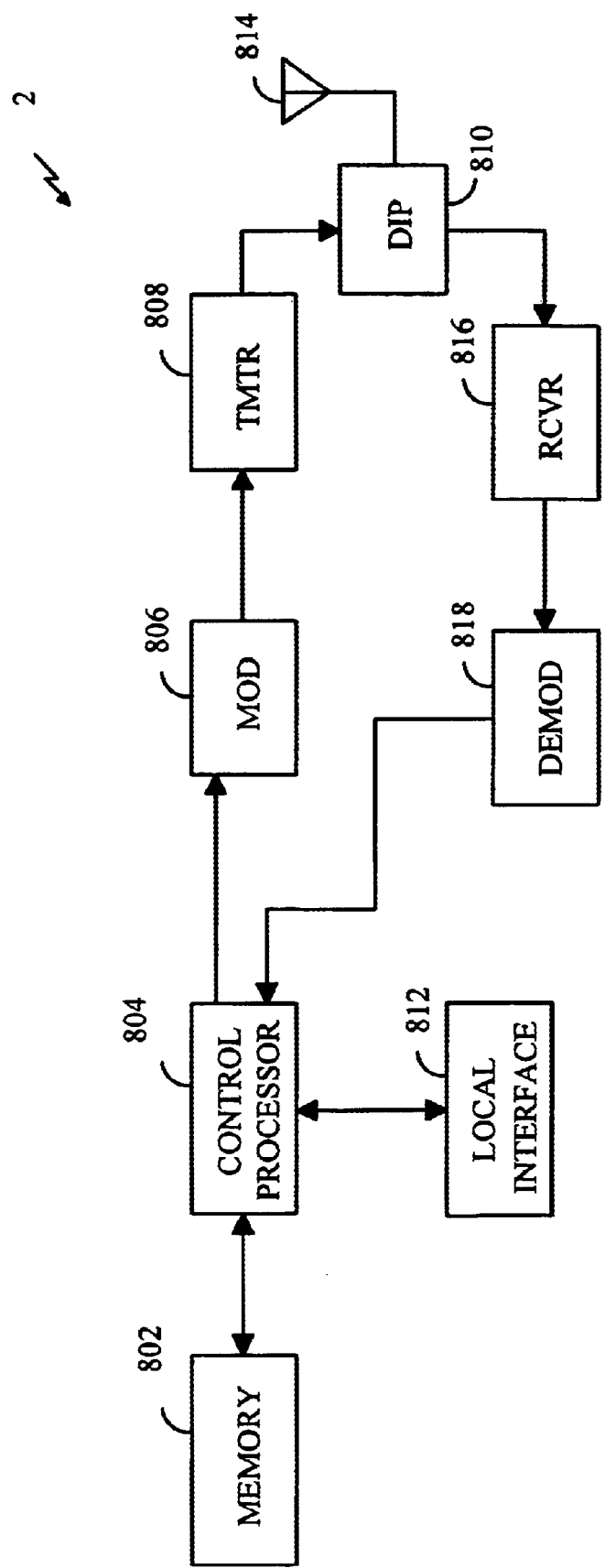
FIG. 9 is a block diagram of a Mobile Station (MS).

FIG. 9 shows an MS 2 apparatus. As discussed above, the MS 2 may have a data connection 12 to an external terminal or device such as a personal or laptop computer (PC) 4. In such a configuration, the MS 2 includes a local interface 812 to provide necessary conversions of data connection signals and digital data. The local interface 812 can be any of a variety of cabled interface types such an Ethernet, serial, or USB. Alternatively, the local interface 812 may provide a wireless connection such as an infrared or other optical connection or a radio connection such as Bluetooth or IEEE 802.11.

Instead of providing a connection to an external PC 4, the MS 2 may provide direct access to the IP network 18. For example, the MS 2 may include a web browser application using such protocols as the Wireless Application Protocol (WAP). In such an incorporated application, the local interface 812 may take the form of a user interface including keypads, Liquid Crystal Display (LCD) displays, or touch-sensitive displays such as pen input interfaces like those commonly used on handheld personal digital assistant devices (PDAs), or any other input interface appropriate for wireless packet data user applications.

In an embodiment, the local interface 812 provides application data to a control processor 804. The control processor 804 may be a general-purpose microprocessor, Digital Signal Processor (DSP), programmable logic device, Application Specific Integrated Circuit (ASIC), or any other device capable of performing the functions described herein. The handset user input interface and handset display may include a keypad, a liquid crystal display pen input interface such as those commonly used on handheld PDAs, or any other input interface appropriate for wireless packet data user applications.

In addition, the control processor 804 is configured to perform the MS 2 processing described in conjunction with FIGS. 1–7, such as requesting IP resources, managing PPP sessions, and other network protocol processes associated with the various wireless interfaces. The control processor 804 may be a single processor, or may include multiple separate processors such as a microcontroller for managing user interface functions through the local interface 812 and a DSP for managing wireless interface protocols.

The MS 2 includes a memory 802 for storing the various types of data and information needed during operation of the control processor 804. The memory 802 may be a single device or may include multiple devices such as non-volatile memory including flash memory, static or dynamic Random Access Memory (RAM), or erasable or non-erasable Read-Only Memory (ROM). The entire memory 802 or portions thereof may be incorporated into a single device with the entire control processor 804 or portions thereof. The memory 802 may contain such information as the executable code for the control processor 804, the IMSI, the shared secret information used to register a mobile IP address, the address of the HA 20, and the mobile IP address. Additionally, the memory 802 is configured to store temporary copies of packet data transmitted to and received from the wireless network, and all the state variables necessary for providing packet data services.

In an embodiment, data to be sent to the wireless network is encoded, modulated, and interleaved in a modulator (MOD) 806, and amplified and upconverted in a transmitter (TMTR) 808 before being transmitted through a diplexer (DIP) 810 and an antenna 814. Data received from the wireless network through the antenna 814 is gain-controlled and downconverted in a receiver (RCVR) 816, deinterleaved, demodulated, and decoded in a demodulator (DEMOD) 818 before being processed by the control processor 804. The modulator (MOD) 806, transmitter (TMTR) 808, receiver (RCVR) 816, and demodulator (DEMOD) 818 are capable of operating using multiple types of wireless interfaces, for example 1x and HDR. If necessary, the MS 2 includes multiple modulators, transmitters, receivers, or demodulators as necessary for compatibility with the multiple types of wireless interfaces, including 1x, HDR, W-CDMA, and EDGE.

Figure 10:
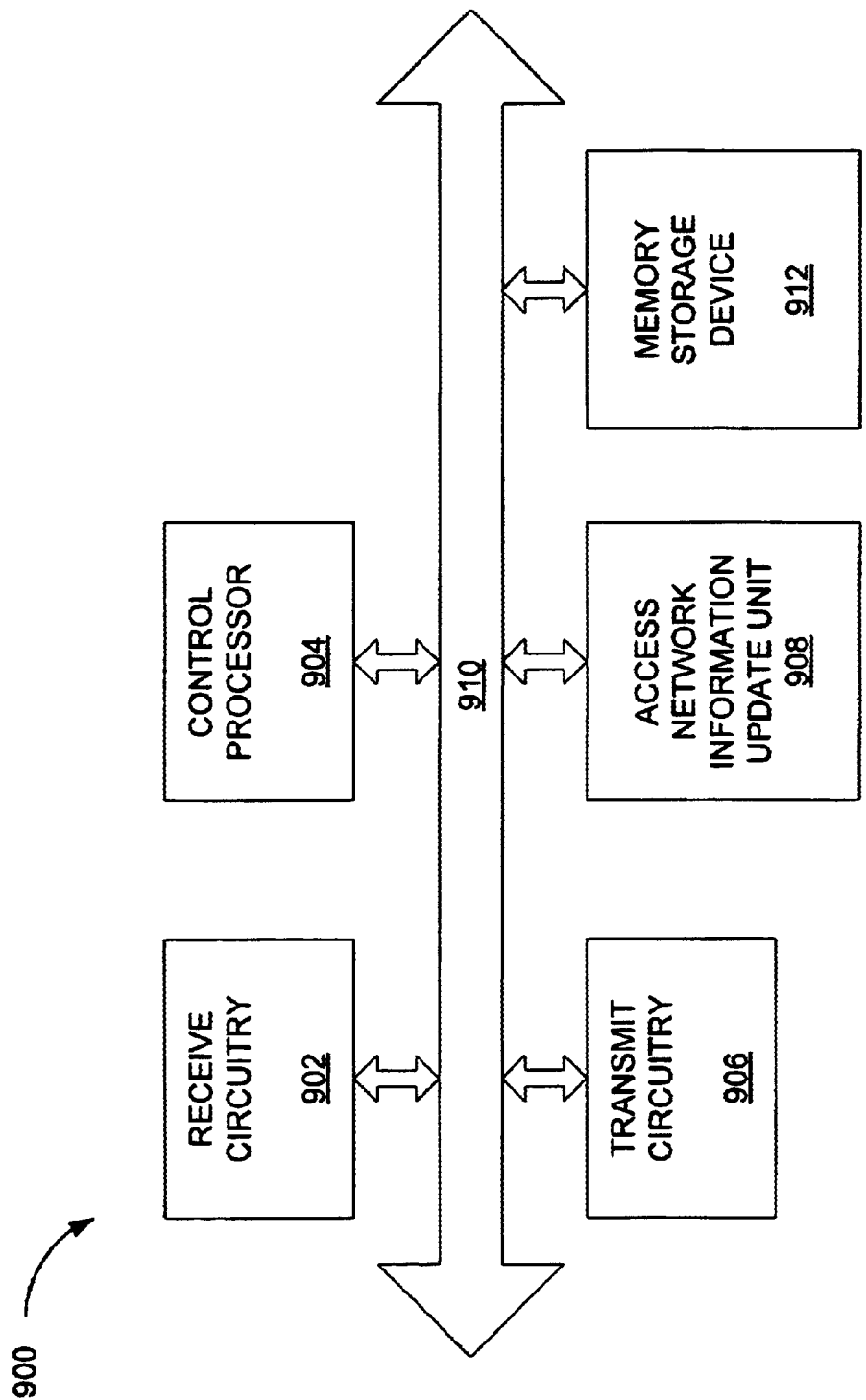
FIG. 10 is a block diagram of an Access Network (AN) element.

FIG. 10 illustrates a PCF 900 including receive circuitry 902, control processor 904, transmit circuitry 906, access network information update unit 908, memory storage device 912, and communication bus 910. The access network information update unit 908 is configured to implement the method 600 illustrated in FIG. 7. The access network identification update unit 908 receives an indication when the AT enters the area supported by the PCF 900. The AT typically sends a Unicast Terminal Access Identifier (UATI). The AT provides an address that enables a target BSC/PCF to find a source BSC/PCF, wherein the target is the new BSC/PCF, i.e., BSC/PCF 900, and the source is the old BSC/PCF relative to the movement of the AT. The BSC/PCF 900 then attempts to retrieve a radio session from the source BSC/PCF. If the PCF 900 is able to retrieve the radio session, the PCF 900 then attempts to reach the last serving PDSN. If possible, contact is made with the last serving PDSN. Else a new connection is established with a new PDSN and the ANID associated with the new PDSN is provided to the AT.

When the BSC/PCF 900 cannot retrieve the radio session from the source BSC/PCF, the BSC/PCF 900 establishes a new radio connection and asks the AT for the LV. If the BSC/PCF 900 is not able to locate the last serving PDSN, the BSC/PCF 900 determines a new serving PDSN and establishes a connection.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor, an application specific integrated circuit, a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for an Access Network (AN) in a high rate packet data communication system, comprising:

receiving a message identifying a source Access Network (AN) associated with an access terminal, the source AN associated with a first Packet Data Serving Node (PDSN);

attempting to contact the first PDSN in response to the message;

establishing a connection with a second PDSN if unable to contact the first PDSN; and transmitting an Access Network ID (ANID) for the second PDSN in response to establishing a connection with the second PDSN;

wherein the ANID corresponds to the second PDSN in a globally unique manner.

2. The method as in claim 1, further comprising:

requesting location information from the access terminal.

3. The method of claim 2, further comprising:

attempting to retrieve a radio session from the source AN.

4. The method of claim 1, wherein the receiving a message comprises receiving a Unicast Terminal Access Identifier (UATI) message.

5. The method of claim 1, wherein the ANID identifies a plurality of Packet Control Function (PCF) nodes, wherein each PCF node identified by the ANID is in an area supported by the second PDSN.

6. A method of performing a handoff of an access terminal in a high rate packet data communication system, comprising:

detecting a change in serving Packet Data Service Node (PDSN) from a first PDSN to a second PDSN for a data communication, wherein a first globally unique identifier corresponds to the first PDSN and a second globally unique identifier corresponds to the second PDSN;

updating location information for the data communication in response to detecting the change, wherein said updating comprising sending the second identifier to the access terminal; and maintaining the location information when no change of serving PDSN is detected.

7. A method for an Access Terminal (AT) in a high rate packet data communication system, comprising:

establishing a data communication;

receiving location information as a function of serving Packet Data Serving Node (PDSN); and updating the location information;

wherein the location information comprises a globally unique Access Network ID (ANID) corresponding to the serving PDSN.

8. The method as in claim 7, further comprising:

sending an indication of a source Access Network (AN) upon entry to a target AN.

9. The method as in claim 8, wherein the indication includes address information.

10. An Access Network (AN) configured for operation in a high rate packet data communication system, comprising:

means for receiving a message identifying a source Access Network (AN) associated with an access terminal, the source AN associated with a first Packet Data Serving Node (PDSN);

means for attempting to contact the first PDSN;

means for establishing a connection with a second PDSN if unable to contact the first PDSN; and means for transmitting an Access Network ID (ANID) for the second PDSN in response to establishing a connection with the second PDSN;

wherein the ANID corresponds to the second PDSN in a globally unique manner.

11. An Access Network (AN) configured for operation in a high rate packet data communication system, comprising:

control processor;

memory storage device coupled to the control processor; and

Access Network information update unit coupled to the control processor and memory storage device, and adapted to update location information associated with a data communication on detection of a change in serving Packet Data Serving Node (PDSN) from a first PDSN associated with a first globally unique identifier to a second PDSN associated with a second globally unique identifier;

wherein updating location information comprises sending the second identifier to an access terminal participating in the data communication.

12. An Access Terminal (AT) in a high rate packet data communication system, comprising:

control processor;

memory storage device coupled to the control processor, and adapted to store location information globally unique to a serving Packet Data Service Node (PDSN), wherein said location information is updated in response to a change in PDSN, and ignored when no change is detected.

13. A method for performing handoff of an access terminal in a high rate packet data communication system from a first Access Network (AN) connected to a first Packet Data Serving Node (PDSN) to a second AN connected to a second PDSN, the method comprising:

receiving, at the second AN, a first message from the access terminal, the first message comprising a globally unique identifier of the first PDSN;

in response to the first message, establishing a connection with the second PDSN; and in response to establishing the connection, sending a second message from the second AN to the access terminal, the second message comprising a globally unique identifier of the second PDSN.

14. The method of claim 13, wherein the second AN does not continuously advertise the globally unique identifier of the second PDSN.

* * * * *